(12) United States Patent
Cooper et al.

(10) Patent No.: US 8,137,494 B2
(45) Date of Patent: Mar. 20, 2012

(54) VACUUM INSULATING GLASS UNIT WITH LARGE PUMP-OUT PORT, AND/OR METHOD OF MAKING THE SAME

(75) Inventors: David J. Cooper, Canton, MI (US); Vijayen S. Veerasamy, Ann Arbor, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 509 days.

(21) Appl. No.: 12/000,669

(22) Filed: Dec. 14, 2007

(65) Prior Publication Data

US 2009/0155500 A1  Jun. 18, 2009

(51) Int. Cl.
*E06B 3/677* (2006.01)

(52) U.S. Cl. .......... 156/104; 156/109; 264/102; 428/34; 65/34; 445/43

(58) Field of Classification Search .................. 156/104, 156/109, 99; 264/102; 428/34; 65/34; 445/43
See application file for complete search history.

(56) References Cited

U.S. PATENT DOCUMENTS

| | | | | |
|---|---|---|---|---|
| 2,887,737 | A | * | 5/1959 | Prescott ............................ 65/43 |
| 5,657,607 | A | | 8/1997 | Collins et al. |
| 5,664,395 | A | | 9/1997 | Collins et al. |
| 5,681,198 | A | * | 10/1997 | Peng et al. ...................... 445/43 |
| 5,769,678 | A | * | 6/1998 | Mohacsi ......................... 445/25 |
| 5,855,638 | A | * | 1/1999 | Demars ............................ 65/34 |
| 5,902,652 | A | | 5/1999 | Collins et al. |
| 6,083,578 | A | * | 7/2000 | Collins et al. ................... 428/34 |
| 6,365,242 | B1 | | 4/2002 | Veerasamy |
| 6,383,580 | B1 | | 5/2002 | Aggas |
| 6,399,169 | B1 | | 6/2002 | Wang et al. |
| 6,444,281 | B1 | | 9/2002 | Wang et al. |
| 6,503,583 | B2 | | 1/2003 | Nalepka et al. |
| 6,541,083 | B1 | | 4/2003 | Landa et al. |
| 6,635,321 | B2 | | 10/2003 | Wang et al. |
| 6,641,689 | B1 | | 11/2003 | Aggas |
| 6,692,600 | B2 | | 2/2004 | Veerasamy et al. |
| 6,701,749 | B2 | | 3/2004 | Wang et al. |
| 6,946,171 | B1 | | 9/2005 | Aggas |
| 7,244,480 | B2 | | 7/2007 | Minaai et al. |
| 2002/0106463 | A1 | * | 8/2002 | Wang .............................. 428/34 |

FOREIGN PATENT DOCUMENTS

| | | |
|---|---|---|
| DE | 100 06 199 | 8/2001 |
| EP | 1 160 217 | 12/2001 |
| EP | 1 439 152 | 7/2004 |

OTHER PUBLICATIONS

International Search Report dated Mar. 18, 2009.

* cited by examiner

*Primary Examiner* — Christopher Schatz
(74) *Attorney, Agent, or Firm* — Nixon & Vanderhye P.C.

(57) ABSTRACT

Certain example embodiments of this invention relate to vacuum insulating glass (VIG) units, and/or methods of making the same. More particularly, certain example embodiments relate to VIG units having large pump-out ports, and/or methods of making the same. In certain example embodiments, a vacuum insulating glass (VIG) unit is provided. First and second spaced-apart glass substrates are provided, and a gap is provided between the spaced-apart substrates. A pump-out port has a size (e.g., diameter) of at least about 30 mm. A cover seals the pump-out port. A getter is in communication with the gap. The pump-out port is sealed using the cover, in making the vacuum insulating glass unit, via a sealing material provided proximate to the cover and/or proximate to the pump-out port.

17 Claims, 3 Drawing Sheets

VACUUM INSULATING GLASS UNIT WITH LARGE PUMP-OUT PORT, AND/OR METHOD OF MAKING THE SAME

FIELD OF THE INVENTION

Certain example embodiments of this invention relate to vacuum insulating glass (VIG) units, and/or methods of making the same. More particularly, certain example embodiments relate to VIG units having large pump-out ports, and/or methods of making the same. In certain example embodiments, a vacuum insulating glass (VIG) unit is provided. First and second spaced-apart glass substrates are provided, and a gap is provided between the spaced-apart substrates. A pump-out port has a diameter of at least about 30 mm. A cover seals the pump-out port. Getter is in communication with the gap. The pump-out port is sealed using the cover, in making the vacuum insulating glass unit, via a sealing material provided proximate to the cover and/or proximate to the pump-out port.

BACKGROUND AND SUMMARY OF EXAMPLE EMBODIMENTS OF THE INVENTION

Vacuum IG units are known in the art. For example, see U.S. Pat. Nos. 5,664,395, 5,657,607, and 5,902,652, the disclosures of which are all hereby incorporated herein by reference.

FIGS. 1-2 illustrate a conventional vacuum IG unit (vacuum IG unit or VIG unit). Vacuum IG unit 1 includes two spaced apart glass substrates 2 and 3, which enclose an evacuated or low pressure space 6 therebetween. Glass sheets/substrates 2 and 3 are interconnected by peripheral or edge seal of fused solder glass 4 and an array of support pillars or spacers 5.

Pump out tube 8 is hermetically sealed by solder glass 9 to an aperture or hole 10 which passes from an interior surface of glass sheet 2 to the bottom of recess 11 in the exterior face of sheet 2. A vacuum is attached to pump out tube 8 so that the interior cavity between substrates 2 and 3 can be evacuated to create a low pressure area or space/gap 6. After evacuation, tube 8 is melted to seal the vacuum. Recess 11 retains sealed tube 8. Optionally, a chemical getter 12 may be included within gap 13.

A typical apparatus for pumping down and sealing of the VIG unit is disclosed in U.S. Pat. No. 7,244,480, the entire contents of which are incorporated herein by reference. In the FIG. 3 embodiment of the '480 patent, for example, while the whole VIG unit is in the atmosphere, the evacuation was accomplished through a pumping port tube using an upside-down cup connected to the vacuum system. Once the pump-down is completed, the pumping port is sealed by tipping off the tube using a device, which can be either a wire heater, or focused IR source, or a laser, or other heating devices.

To achieve good insulating characteristics, the vacuum cavity must be under vacuum, typically below about $1 \times 10^{-4}$ torr. The vacuum is created by means of vacuum pump removal of gasses between the edge-sealed plates of glass through a vacuum port or pump-out port. Typically, the pump out port includes a small diameter glass tube inserted into a pre-drilled hole in one of the glass plates, which is affixed and sealed using a perimeter ceramic frit, solder glass, and/or by other means. Once the appropriate vacuum level is reached within the vacuum gap, the glass tube is melted on the exposed end with a heat source, thereby sealing the vacuum gap and maintaining the vacuum within the hermetically sealed glass plates. The time required to pump-down the VIG assembly to required absolute pressure is a function of the pump out tube hole diameter.

Conventionally, the hole has an outer diameter of less than about 5 mm and, typically, the hole outer diameter is only about 1-2 mm. The pump out tube diameter must be small in order to quickly melt the end and allow the glass wall to collapse upon itself in order to seal the tube. Ultimate vacuum may not be reached if the pump out tube diameter is too small. However, if the tube is too large, there often are difficulties associated with focusing a laser on the tube to cause the melting thereof.

Conventional sealing techniques, including laser-sealing techniques, disadvantageously trap radicals in the vacuum. For example, CO* radicals may be emitted from the carbonates in the glass into the vacuum. This causes a pressure increase within the gap between substrates, resulting in a degradation in the insulating characteristics of the assembled VIG unit (e.g., a substantially instantaneous reduction in R-value). Larger holes tend to trap more radicals. This degradation occurs in addition to the normal degradation caused when the VIG unit is exposed to UV radiation, as it is under normal conditions.

Thus, it will be appreciated that there is a need in the art for improved VIG units, and/or methods of making the same, that overcome one or more of these and/or other disadvantages. In addition, it also will be appreciated that there is a need in the art for pump-out ports having an increased diameter, improved vacuum and sealing techniques, and/or methods for the same.

In certain example embodiments of this invention, a method of making a vacuum insulating glass (VIG) window unit is provided. First and second spaced-apart glass substrates are provided, a gap being provided between the spaced-apart substrates. A pump-out port has a size (e.g., diameter) of at least about 30 mm. A cover for use in sealing the pump-out port is provided. Getter is in communication with the gap. The pump-out port is sealed using the cover, in making the vacuum insulating glass unit, via a sealing material provided proximate to the cover and/or proximate to the pump-out port.

In certain example embodiments, a vacuum insulating glass (VIG) unit is provided. First and second spaced-apart glass substrates are provided, and a gap is provided between the spaced-apart substrates. A pump-out port has a diameter of at least about 30 mm. A cover seals the pump-out port. Getter is in communication with the gap. The pump-out port is sealed using the cover, in making the vacuum insulating glass unit, via a sealing material provided proximate to the cover and/or proximate to the pump-out port.

The features, aspects, advantages, and example embodiments described herein may be combined to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Certain embodiments of this invention relate to an improved peripheral or edge seal in a vacuum IG window unit, and/or a method of making the same. "Peripheral" and "edge" seals herein do not mean that the seals are located at the absolute periphery or edge of the unit, but instead mean that the seal is at least partially located at or near (e.g., within about two inches) an edge of at least one substrate of the unit. Likewise, "edge" as used herein is not limited to the absolute edge of a glass substrate but also may include an area at or near (e.g., within about two inches) of an absolute edge of the substrate(s). Also, it will be appreciated that as used herein the term "VIG assembly" refers to an intermediate product prior to at least the evacuation of the gap including, for example, two parallel-spaced apart substrates. Also, while a component may be said to be "on" or "supported" by one or more of the substrates herein, this does not mean that the component must directly contact the substrate(s). In other words, the word "on" covers both directly and indirectly on, so that the component may be considered "on" a substrate even if other material (e.g., a coating and/or thin film) is provided between the substrate and the component.

In certain example embodiments of this invention, a vacuum insulating glass (VIG) unit and/or method of making the same is provided. First and second spaced-apart glass substrates are provided, and a gap is provided between the spaced-apart substrates. A pump-out port has a size (e.g., diameter) of at least about 30 mm. The word "size" as used herein means diameter, width or other distance across the port, preferably at its widest location. A cover seals the pump-out port. Getter is in communication with the gap. The pump-out port is sealed using the cover, in making the vacuum insulating glass unit, via a sealing material provided proximate to the cover and/or proximate to the pump-out port.

Increasing the pumping port open area has several associated advantages. For example, a larger area allows for faster pump-down to the ultimate vacuum level desired with a given vacuum pumping system. Also, a larger area may facilitate a lower ultimate vacuum level, which means better insulating properties for the VIG unit. Additionally, novel designs may allow getter material to be incorporated through the port as a part of the vacuum port plug, a sealing device, and/or as a stand alone cell. Getter materials advantageously may be incorporated into VIG units to remove traces of gas from sealed evacuated systems. Still further, aesthetic features may be incorporated into a sealing device, e.g., a bung may be laser-etched or sandblasted with a logo, trademark, and/or may incorporate other markings. The port may be designed to be self-sealing, by means of the cavity vacuum, pulling the closing device tighter to create an improved gas seal.

Figure 2:
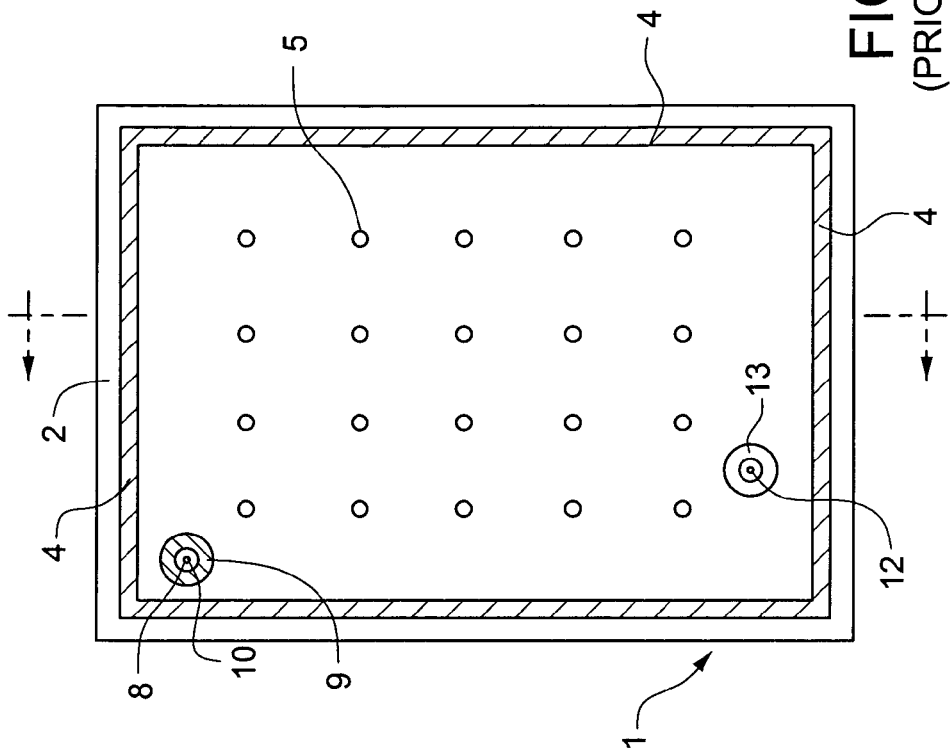
FIG. 2 is a prior art top plan view of the bottom substrate, edge seal, and spacers of the FIG. 1 vacuum IG unit taken along the section line illustrated in FIG. 1.
Figure 1:
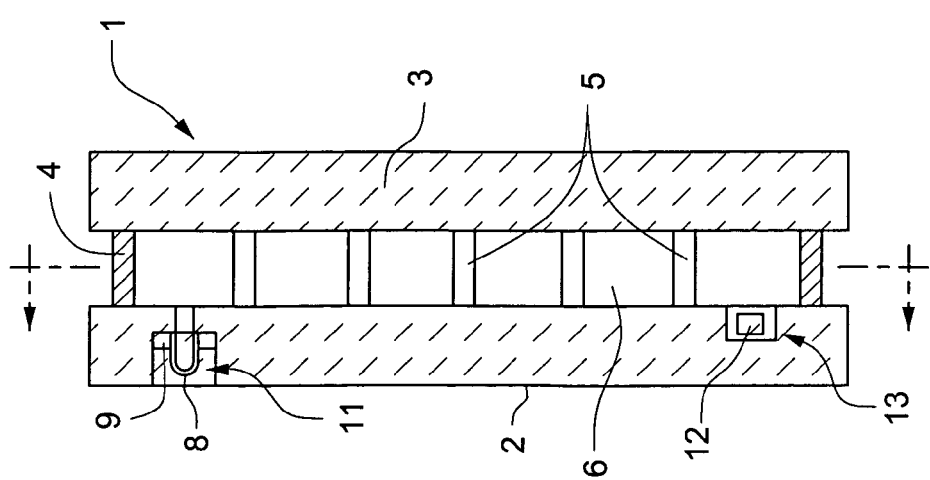
FIG. 1 is a prior art cross-sectional view of a conventional vacuum IG unit.
Figure 3:
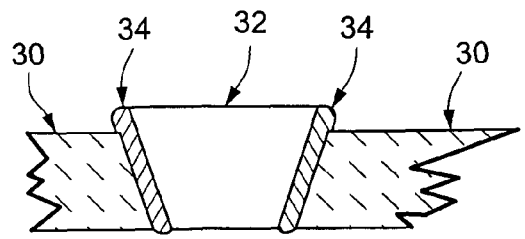
FIG. 3 is an illustrative side view of a glass bung inserted into a bung hole of a substrate in accordance with an example embodiment.

A first example design technique relates to the inclusion of a bung style port, which will now be described in connection with FIGS. 3-7. FIG. 3 is an illustrative side view of a glass bung 32 inserted into a bung hole 40 of a substrate 30 in accordance with an example embodiment. In FIG. 3, a pre-manufactured glass bung 32 is used. The glass bung 32 includes a tapered shape that mates to a pre-drilled tapered hole 40 formed in one of the glass substrates 30. In particular, the bung 32 is tapered such that it is wider towards the exterior surface of the bung 32 and narrows towards the gap between substrates. The taper is between about 5 degrees and 50 degrees from vertical, and more preferably between about 10 degrees and about 35 degrees from vertical, such that the bung 32 will seal tightly to the mating pre-drilled hole 40 in the substrate 30. The bung 32 is designed so that it is substantially flush with (e.g., only slightly raised above) the outer surface of the substrate 30. The top surface of the bung 32 may include an aesthetic feature such as, for example, a laser-etched or sandblasted emblem, logo, and/or other design. Preferably, the bung size (e.g., diameter) at its smallest or largest location is greater than about 30 mm, more preferably greater than about 40 mm, and still more preferably greater than about 50 mm.

Figure 4:
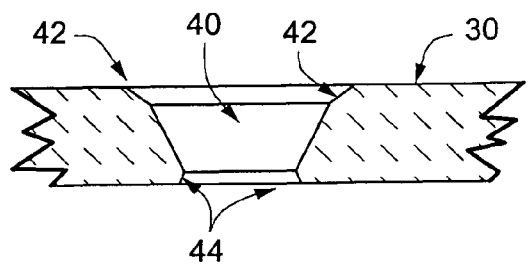
FIG. 4 is a more detailed side view of a bung hole in accordance with an example embodiment.

FIG. 4 is a more detailed side view of a bung hole 40 in accordance with an example embodiment. The taper of the hole 40 corresponds to the taper angle of the bung 32. Preferably, the main taper of the hole 40 differ from the taper angle of the bung 32 by no more than about 5 degrees, more preferably by no more than about 3 degrees, and still more preferably by no more than about 2 degrees. In certain example embodiments, the tapered hole may include chamfered edges 42, 44 proximate to the outer and inner surfaces of the substrate 30, respectively. The chamfered edges 42, 44 may help reduce the likelihood of breakage caused by edge imperfections. The hole 40 may be made with any suitable technique such as, for example, with a 1- or 2-sided drill, with water jet equipment, and/or the like. Additionally, a grinding operation may be performed on the tapered hole 40 (e.g., after it is initially formed), for example, to smooth the surface of the hole 40 and thereby reduce imperfections that could cause breakage.

Figure 5:
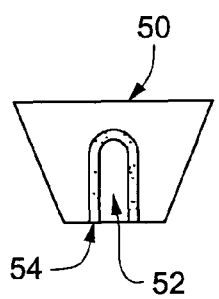
FIG. 5 is an illustrative bung including getter material in accordance with an example embodiment.

Getter material may be applied to the bung and/or to one or both tapered edges of the bung hole 40. For example, FIG. 5 is an illustrative bung 50 including getter material 54 in accordance with an example embodiment. A recess or channel 52 is formed in the bung 50. The edges of the recess may have getter material 54 applied thereto.

Figure 6:
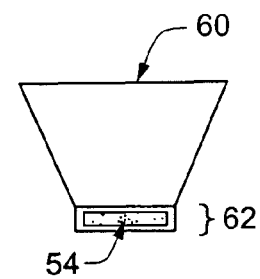
FIG. 6 is an illustrative bung including a getter cell attached to a bottom surface thereof, in accordance with an example embodiment.

Additionally, or in the alternative, a bung may have a getter cell connected thereto. For example, FIG. 6 is an illustrative bung 60 including a getter cell 62 attached to a bottom surface thereof, in accordance with an example embodiment. The getter cell 62 including the getter material 54 may be activated once the VIG unit is sealed. In certain example embodiments, the getter cell 62 may be a stand-alone component. In certain example implementations, the getter cell 62 may be substantially cylindrically shaped. The outer size (e.g., diameter) of the cell 62 may be slightly smaller than the small end of the tapered hole 40 so that it may be placed inside the VIG assembly prior to final sealing.

Figure 7:
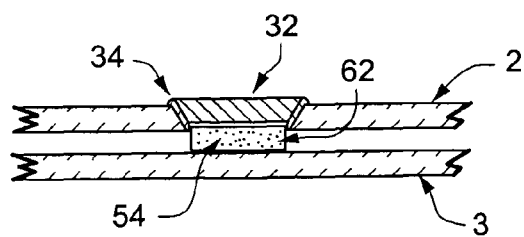
FIG. 7 is a VIG assembly including a getter cell and a bung in accordance with an example embodiment.

FIG. 7 is a VIG assembly including a getter cell 62 and a bung 32 in accordance with an example embodiment. As shown in FIG. 7, the getter cell 62 may sometimes be slightly taller than the gap between the panes of glass 2, 3. The bung 32 may be sized such that it does not touch the getter cell 62 once in place and sealed. The getter cell may be loose, or free floating, within the gap between the substrates 2, 3. Also, the getter cell 62 may be designed with a perimeter ring of small standoffs to reduce the amount of direct contact with the bottom glass substrate 3. Additionally or in the alternative, the getter and/or the getter cell may be slightly curved at the bottom to reduce contact points. Additionally or in the alternative, the getter and/or the getter cell may be slightly curved at the bottom to reduce contact points.

Referring once again to FIG. 3, the bung 32 may be sealed (e.g., to the substrate 30) using any suitable means. For example, a frit 34 that is fired may help to seal the vacuum port. In a first example implementation, the frit 34 may be applied at a prescribed thickness to the sealing surfaces of the hole 40 and/or the bung 32, and also may be pre-fired prior to a vacuum process step. Once a desirable vacuum level is achieved, the bung 32 and surrounding glass may be heated to the melting point of frit 34, e.g., using a localized heat source such as, for example, focused infrared, microwave, laser, and/or heat sources, to re-melt the frit and bond the bung to the glass panel and hermetically seal the VIG unit.

In a second example implementation, the frit 34 may be applied externally, e.g., as a paste around the perimeter of the bung 32. The area may be heated, e.g., using a localized heat source to melt the frit 34 and create the seal. In a third example implementation, a localized heat source with focused heating may be used to melt the glass between the bung 32 and the glass panel 30. In a fourth example implementation, the bung 32 may be coated to a specific thickness with a metal, such as Indium, which may act as a solder between the bung 32 and glass panel 30 surfaces when melted using a focused heat source. It will be appreciated that these bung-sealing techniques may be used alone or in various combinations.

Figure 8:
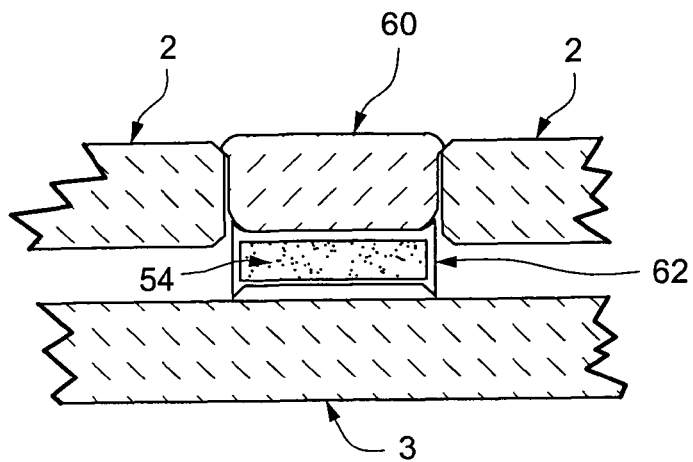
FIG. 8 is an illustrative side view of molten glass inserted into a hole of a substrate in accordance with an example embodiment.

A second example design technique relates to the inclusion of a molten glass seal, which will now be described in connection with FIG. 8, which is an illustrative side view of molten glass 60 inserted into a hole of a substrate 2 in accordance with an example embodiment. A defined volume of molten glass 60 is metered from a heated tube into the hole of the glass substrate 2. The hole may be sized according to the example dimensions provided above or in some other way. The hole may be tapered as described above, or it may be substantially straight. Once the molten glass volume is dispensed, the molten glass is tamped to bring it level or slightly above level with the top surface of the glass substrate 2. A tamping device is brought into contact with the molten glass 60 and pushes it further into the hole. The tamping device may contain an emblem or logo or other marking to create an imprint or other aesthetic feature in the molten glass surface.

The molten glass may be suspended above the bottom glass panel by means of a getter cell 62, or by other mechanical means so as to reduce the amount of direct contact with the bottom substrate 3, which otherwise may impair thermal insulation effect. Getter material 54 may be incorporated into such a design. The getter cell 62 may be designed, sized, positioned, etc., in the above-described and/or other ways.

As described above, the hole may have straight or tapered sides and also may incorporate chamfered edges, e.g., to reduce the likelihood of thermal stress and/or breakage caused by edge imperfections. The hole may be formed and/or finished using the above-described and/or other techniques.

Figure 9:
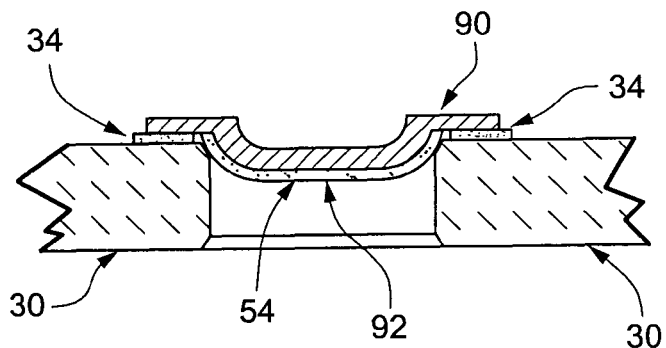
FIG. 9 is an illustrative side view of a metal disc covering a hole of a substrate in accordance with an example embodiment.

A third example design technique relates to the inclusion of a metal disc seal, which will now be described in connection with FIGS. 9-10. FIG. 9 is an illustrative side view of a metal disc 90 covering a hole of a substrate 30 in accordance with an example embodiment, and FIG. 10 is another illustrative side view of a metal disc 90 covering a hole of a substrate 2 in accordance with an example embodiment.

Figure 10:
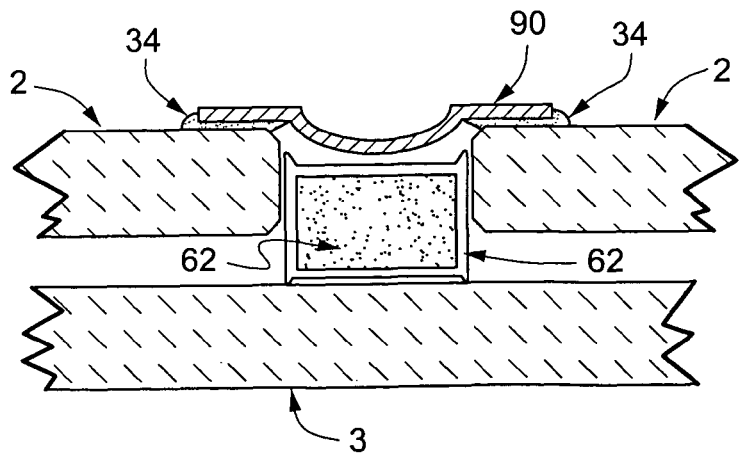
FIG. 10 is another illustrative side view of a metal disc covering a hole of a substrate in accordance with an example embodiment.

In both FIGS. 9 and 10, a pre-manufactured metal disc 90 is utilized to seal the pump-out hole. The metal disc 90 optionally may be a stamped shape that mates with a pre-drilled hole (e.g., in the substrate 30 in FIG. 9 and the substrate 2 in FIG. 10). The "metal strip" may be made of one metal or a plurality of metals (metal alloy), and may include small amounts of non-metals such as oxygen or the like, and also may coated with a non-metal. The metal chosen may have approximately the same coefficient of thermal expansion as that of the glass substrates. The coefficient of thermal expansion is a thermodynamic property of a substance that relates the change in temperature to the change in a material's dimensions. The coefficient of thermal expansion for soda lime glass is about $8.5 \times 10^{-6}$/K at room temperature. Preferably, the coefficient of thermal expansion between the metal and the glass vary by not more than about 30%, more preferably by not more than about 25%, and still more preferably by not more than about 15%. In certain example embodiments, the difference between the coefficients of thermal expansion may be measured over (e.g., compared or averaged over) a temperature range of interest, which may be from about −40° C. to about 50° C. in certain example implementations. Thus, the metal may be somewhat flexible.

In certain example embodiments, the metal itself may be resistant to atmospheric oxidation, as it may be exposed to atmospheric conditions. Additionally, or in the alternative, a metallic and/or other coating may be applied to at least a portion of the strip (e.g., the entire strip, the outwardly exposed portions of the strip, etc.) to reduce the impact of atmospheric oxidation. Such an oxidation-reducing coating may be of any suitable metal, or alternatively may be of silicon nitride or the like in example embodiments.

As shown in FIG. 9, the bottom surface of the metal disc 90 may incorporate a getter material 54, or another material that has a reduced susceptibility to outgassing and/or oxidation. The metal disc 90 will cover a hole sized according to the example dimensions provided above or in some other dimensions. The metal disc 90, may be substantially flat or it may be a stamped disc that includes a depression, the depression covering at least a portion of the hole. With respect to the latter design arrangement, FIGS. 9 and 10, for example, show a metal disc 90 including a depression formed approximately in the center thereof. The depression covers most of the hole, and two feet extend from either side of the depression so as to be on, directly or indirectly, the outer surface of the glass substrate, e.g., to provide stability and/or to help more fixedly attach the metal disc 90 to the appropriate substrate. The top surface of the plate may contain a stamped, laser etched or sandblasted, and/or otherwise provided emblem, logo, or other aesthetic feature.

The metal disc 90 related arrangements also may incorporate getter. For example, as shown in FIG. 9, the metal disc 90 may incorporate the getter 54 as a surface application on the bottom side thereof (e.g., the side closest to the substrate). A protective metal film 92 may encapsulate the getter until it is ready for use (e.g., until the metal disc 90 has been placed on and/or fixed to the substrate 30, after a vacuum is created in the gap between the substrates, etc.).

In certain example arrangements, a getter cell may be attached to a bottom surface of the metal disc 90. The getter cell including the getter material 54 may be activated once the VIG unit is sealed. In certain example embodiments, the getter cell may be a stand-alone component. In certain example implementations, the getter cell may be substantially cylindrically shaped. The outer size (e.g., diameter) of the cell may be slightly smaller than the small end of the tapered hole so that it may be placed inside the VIG assembly prior to final sealing.

As shown in FIG. 10, the getter cell 62 may sometimes be slightly taller than the gap between the panes of glass 2, 3. The metal strip 90 may be formed such that it does not touch the getter cell 62 once in place and sealed (e.g., a depression of the metal disc 90 does not contact the getter cell 62). The getter cell may be loose, or free floating, within the gap between the substrates 2, 3. Also, the getter cell 62 may be designed with a perimeter ring of small standoffs to reduce the amount of direct contact with the bottom glass substrate 3. Additionally or in the alternative, the getter and/or the getter cell may be slightly curved at the bottom to reduce contact points.

As described above, the hole may have straight or tapered sides and also may incorporate chamfered edges, e.g., to reduce the likelihood of thermal stress and/or breakage caused by edge imperfections. The hole may be formed and/or finished using the above-described and/or other techniques.

The metal disc 90 may be sealed to a substrate in any suitable fashion. For example, certain example embodiments may incorporate a sealing material or compound 34 (described in greater detail below) that is fired or melted to seal the vacuum port. In a first example sealing technique, ceramic frit is applied as an ink to the sealing surfaces of the hole and the metal disc and is pre-fired (e.g., melted and allowed to cool and harden) prior to vacuum process step. During the vacuum pump-out process, once vacuum level is achieved, the disc and surrounding glass is heated to the melting point of frit. This may be accomplished using localized heating from a localized heat source such as, for example, a focused infrared (IR), microwave, laser, and/or other localized heat source, to re-melt the frit and bond the disc to the glass panel.

In a second example sealing technique, frit is applied externally as a paste around the perimeter of the metal disc. The frit is then heated to the melting point using a localized heat source to melt the frit and create a permanent seal. In a third example sealing technique, the disc is coated to a specific thickness of a glass solder metal, such as Indium, which acts as a solder between the disc and glass panel surfaces, and is melted using a focused heat source and then allowed to cool.

It will be appreciated that such example sealing techniques may be used alone or in various combinations. Also, it will be appreciated that any suitable sealing material may be used (e.g., a metal frit of lead, silver, Indium; a ceramic or glass frit; and/or the like) in connection with certain example embodiments. Also, it will be appreciated that such sealing materials may be applied to at least a portion of the metal disc (e.g., proximate to where the metal disc will contact, directly or indirectly, the substrate, etc.) and/or to the substrate proximate to where it will contact, directly, or indirectly, the metal strip. A frit-to-frit bond may advantageously promote the bonding in certain example embodiments. Optionally, sealing material may be placed over the cover (e.g., directly or indirectly on the bung, glass, or metal disc) after it is at least initially placed on or sealed to the substrate.

It will be appreciated that the vacuum applied to the assembly will "pull" the particular cover implemented further and further "into" the gap in the substrate, thereby forming a good seal. Optionally, the cover (e.g., the bung, glass, or metal disc) may be preheated, e.g., to reduce cracks from forming in the cover and/or the sealing material. The heating may be close to the melting point of glass (which generally is from about 400° C.-600° C., and is about 580° C. for soda lime glass, depending on the composition of the glass).

In certain example embodiments, the large pump-out port is provided proximate to a corner of the VIG assembly. However, it will be appreciated that the pump-out hole of certain example embodiments may be formed in various locations, including locations on either the first or second substrate, or in edge seal of the VIG unit (which typically is made of a frit). Also, the getter material used in connection with certain example embodiments described herein may be any suitable getter, such as, for example, a getter material commercially available from SAES. The getter material may include, for example, barium, aluminum, magnesium, calcium, sodium, strontium, cesium, and/or phosphorus. The getter material may be "activated" as described above in any suitable manner. For example, heat may be focused onto the cell or film encasing the getter material, e.g., to burn a hole therein or otherwise expose the getter.

In certain example embodiments, the amount of getter included in the assembly may be sufficient to reduce the amount of outgassing experienced by conventional VIG units to thereby maintain the gap between the substrates at or close to its desired vacuum pressure, e.g., over the life of the VIG unit (typically defined by a warranty period). Thus, the insulating characteristics of the VIG unit (e.g., as measured by the R-value of the VIG unit) also may be may be maintained over this period.

It will be appreciated that the example embodiments described herein may be used in connection with a variety of different VIG assembly and/or other units or components. For example, the substrates may be glass substrates, heat strengthened substrates, tempered substrates, etc.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of making a vacuum insulating glass (VIG) window unit, the method comprising:
   providing first and second spaced-apart glass substrates, a gap being provided between the spaced-apart glass substrates;
   providing a pump-out port in one of the glass substrates, the pump-out port having a size of at least about 30 mm;
   providing a cover for use in sealing the pump-out port;
   providing a getter in communication with the gap;
   sealing the pump-out port using the cover, in making the vacuum insulating glass unit, via a sealing material provided proximate to the cover and/or the pump-out port.

2. The method of claim 1, further comprising applying the getter to at least a portion of the cover.

3. The method of claim 1, further providing a getter-inclusive cell located in the gap between the substrates.

4. The method of claim 1, wherein the pump-out port has a diameter of at least about 50 mm.

5. The method of claim 1, further comprising tapering the pump-out port to an angle of from about 10 degrees to about 35 degrees from vertical, the pump-out port being narrowest proximate to the gap between the substrates.

6. The method of claim 1, further comprising chamfering one or more edges of the pump-out port.

7. The method of claim 1, wherein the cover comprises a glass bung.

8. The method of claim 7, further comprising tapering the pump-out port to an angle of from about 10 degrees to about 35 degrees from vertical, the pump-out port being narrowest proximate to the gap between the substrates, and
wherein the glass bung is tapered to an angle differing from the angle of the pump-out port by no more than about 5 degrees.

9. The method of claim 7, further comprising forming a recess in the glass bung such that the recess opens into the gap between the substrates; and
applying a getter to the glass bung proximate to the recess.

10. The method of claim 1, further comprising at least initially providing the cover as molten glass; and
tamping the molten glass into place such that, when hardened, the glass does not contact both the first and second substrates.

11. The method of claim 1, wherein the cover comprises a metal disc.

12. The method of claim 11, wherein the metal disc includes a depression at least partially insertable into the pump-out port.

13. The method of claim 1, further comprising preheating the cover to facilitate the sealing of the pump-out port.

14. The method of claim 1, further comprising:
applying the sealing material to the first and/or second substrates proximate to the pump-out port, and/or to the cover at one or more glass-to-edge-sealing surfaces thereof; and
bonding the at least one cover to the first and/or second substrates proximate to the pump-out port by heating and cooling, in this order, and wherein the sealing material is at least partially melted during heating of the substrates and the cover.

15. The method of claim 14, further providing localized heat at least proximate to the pump-out port in order to cause the at least partial melting of the sealing material.

16. The method of claim 14, further comprising providing the sealing material over the cover and/or to an area proximate to the sealed pump-out port.

17. The method of claim 1, further comprising evacuating an area between the first and second substrates to a pressure less than atmospheric in making the VIG unit.

* * * * *